Sept. 21, 1954  J. H. FRIEDMAN  2,689,359
FORGING APPARATUS FOR MAKING PIPE PLUGS
Filed Feb. 23, 1951  3 Sheets-Sheet 1

INVENTOR.
JOHN H. FRIEDMAN
BY Richey & Watts
ATTORNEYS

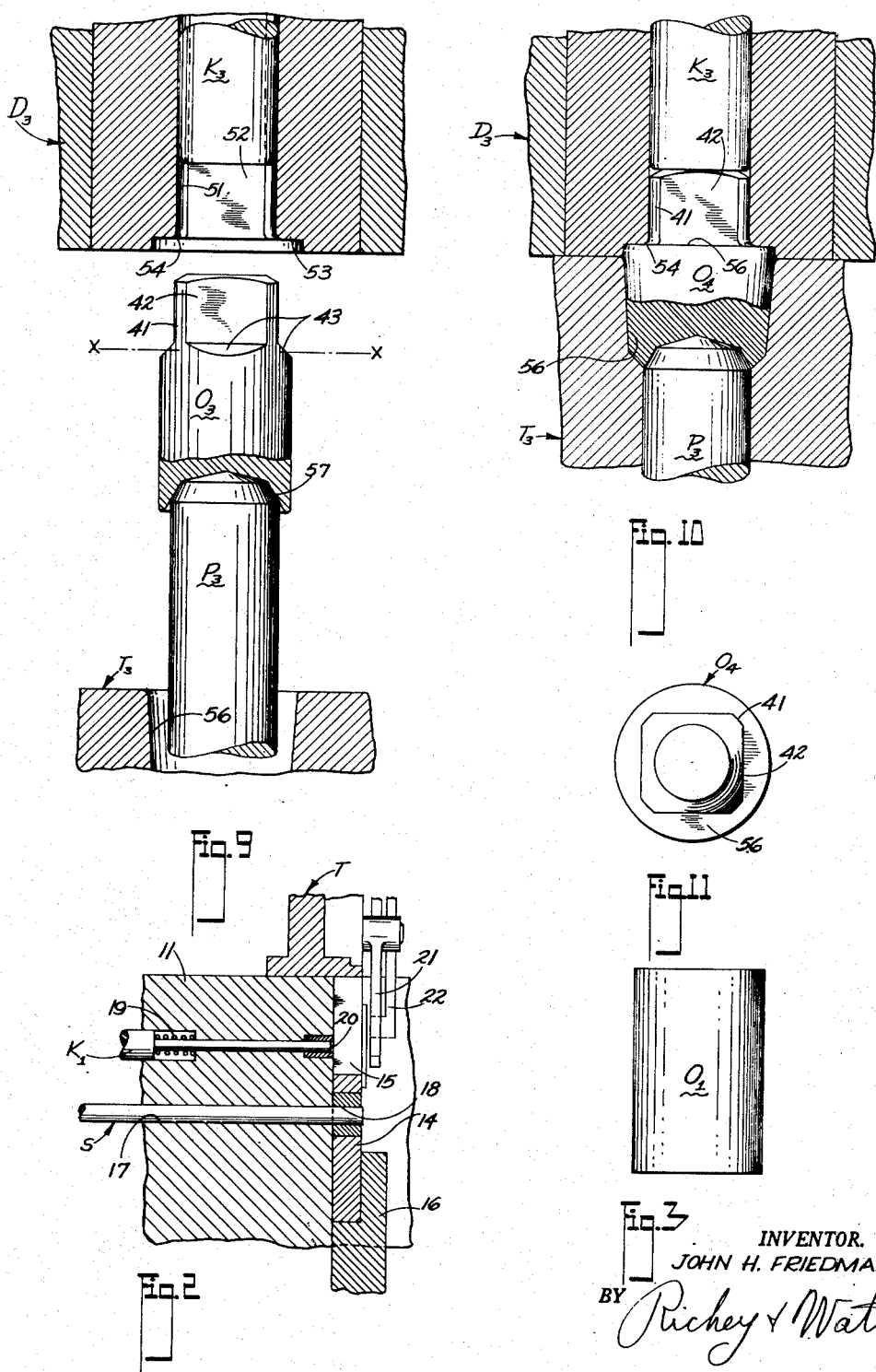

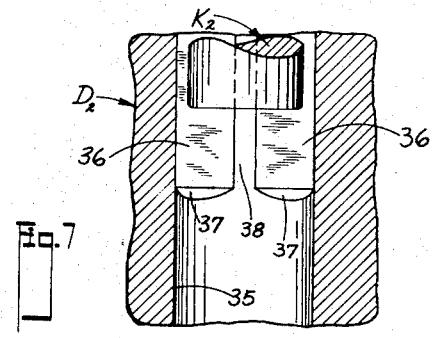
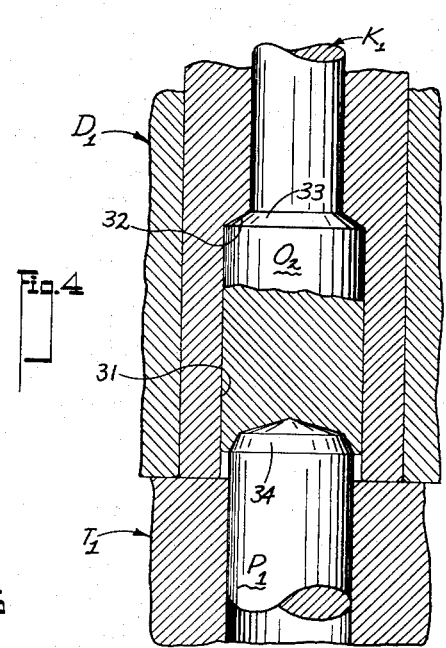
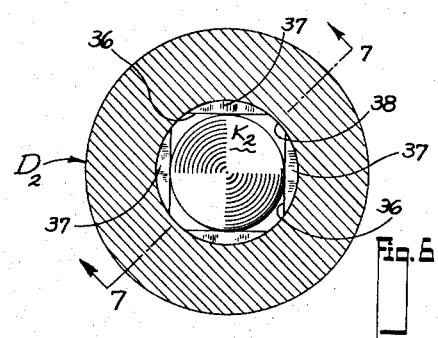
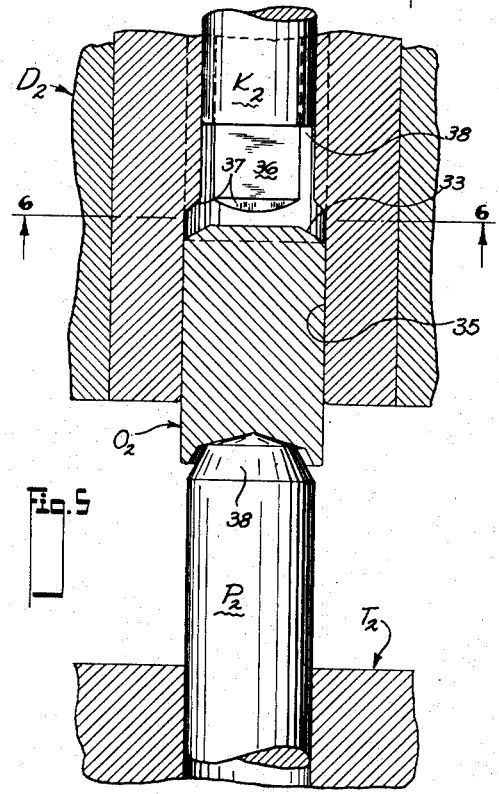
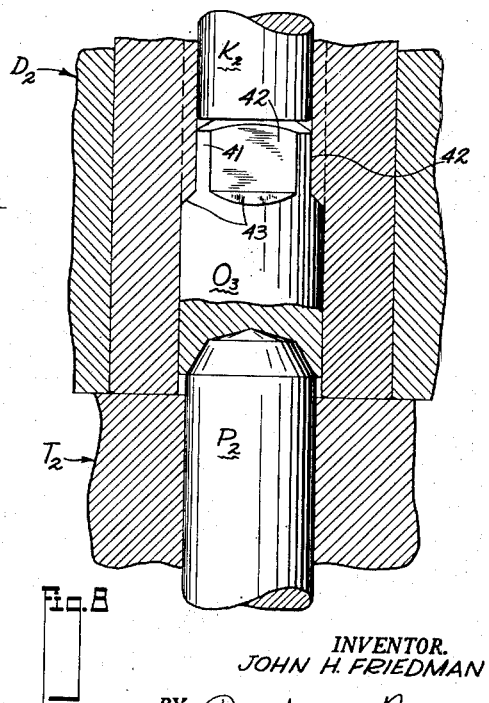
INVENTOR.
JOHN H. FRIEDMAN

Patented Sept. 21, 1954

2,689,359

UNITED STATES PATENT OFFICE 2,689,359

FORGING APPARATUS FOR MAKING PIPE PLUGS

John H. Friedman, Tiffin, Ohio, assignor to The National Machinery Company, Tiffin, Ohio, a corporation of Ohio Application February 23, 1951, Serial No. 212,326

3 Claims. (Cl. 10—12)

This invention relates to the method and apparatus for forming articles of metal by cold working which includes forming a blank having a shank portion of polygonal cross-section and a body portion, the cross-section of which is generally circular.

For example, in the application of the method disclosed herein, a pipe plug blank is formed in a multiple station cold header starting with rod or wire stock of cylindrical section. Heretofore it has not been feasible to form blanks having a body of circular section and a polygonal shank starting with cylindrical stock and employing tool and die sets, so that articles such as pipe plugs or the like have not been mass produced by cold headers or other machines involving relatively reciprocating tools and dies.

It is an object of the invention to form by cold working a blank of the nature described without excessive die wear caused by high formative pressures, without need for complicated tool and die sets, and in a relatively small number of operations or steps. For example, in the preferred application of the invention described in detail herein, a pipe plug blank is produced as follows: A length of stock is sheared from rod or wire stock of circular section. One end of the stock is then beveled or chamfered in a first tool and die set. In a second tool and die set the beveled end is extruded to form a square shank. The shank may be brought to substantially its final cross-sectional shape in the second tool and die set by extruding the beveled end portion of the stock against a tapered or beveled throat leading to flats or restrictions that form polygonal recesses in the die. In the third tool and die set, the beveled juncture between the shank and the body, (necessarily resulting from the beveled throat in the second die) is removed by placing the shank in a polygonal recess intersected by a plane perpendicular to the axis thereof whereby relatively sharp corners are formed that remove the aforesaid beveled juncture. Simultaneously, the remainder or cylindrical portion of the blank now projects past the die face and hence may be upset or gathered to form a tapered portion which is to be threaded. Thus, in addition to the shearing operation (which may or may not be necessary depending upon the source of the cylindrical blanks) only three steps are required to form a finished pipe plug blank having a square shank for reception of a wrench and an enlarged tapered portion which is eventually threaded to complete the article.

The nature of the method and the construction of apparatus suitable for performing the same will be understood from the following detailed description of a typical application of the method to the production of pipe plug blanks.

In the drawings:

Fig. 2 is a vertical section through the shearing station;

Fig. 3 shows the cylindrical blank which may be sheared from rod or wire stock;

Fig. 4 shows the operation in the first tool and die set;

Fig. 5 shows the beginning of the operation in the second tool and die set;

Fig. 6 is a section taken on 6—6 of Fig. 5;

Fig. 7 is a section of the die taken on 7—7 of Fig. 6;

Fig. 8 shows the completed operation in the second die;

Fig. 9 shows the blank about to be inserted in the third die;

Fig. 10 shows the completed blank in the third die; and,

Fig. 11 is an end view of the completed blank.

Figure 1:
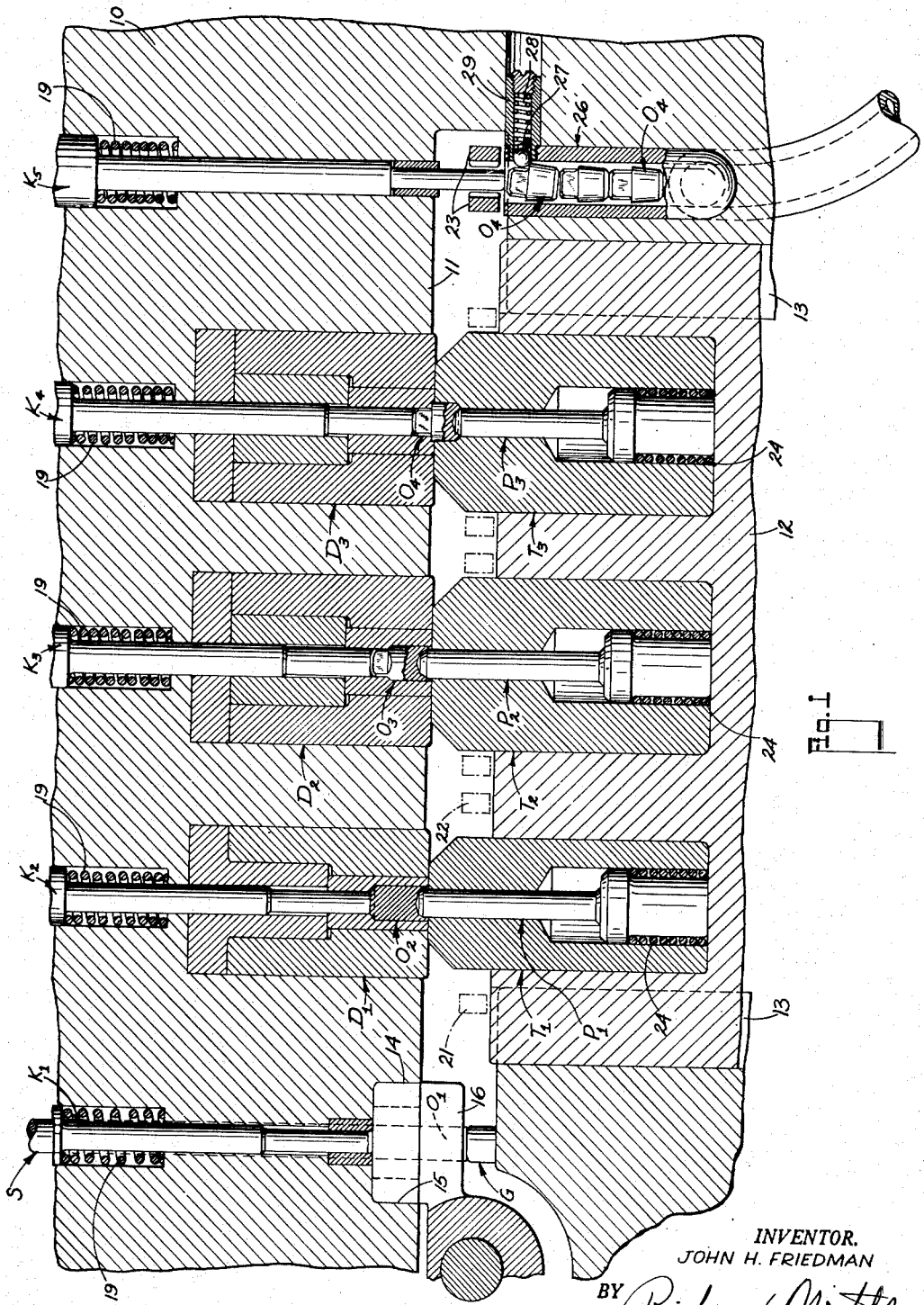
Fig. 1 is a horizontal fragmentary section through a cold header at the die and tool axis.

Apparatus to carry out applicant's method as shown herein is preferably arranged on a multiple station cold header, but the method aspects of the invention are not limited to the use of a specific type of metal working apparatus. Only so much of the header is shown as is necessary to understand the invention. Reference is made to my copending application, Serial No. 215,142, filed March 12, 1951, wherein additional details of a preferred form of apparatus are disclosed, it being understood that drive mechanism for the feed, shear, knockout, and transfer elements of cold headers suitable for carrying out the invention are known to those skilled in the art.

Referring to Fig. 1, a suitable cold header includes a bed frame 10, a die breast 11, and a reciprocating slide 12 mounted in guides 13 in the frame. As best seen in Figs. 1 and 2, a vertically reciprocable shear knife 14 slides in a groove 15 in the die breast and is carried by and moved by the bracket 16, as is more fully described in my aforesaid copending application.

Rod or wire stock S is fed through the feed opening 17 into a shearing aperture 18 in the shear knife 14 until it abuts against a stock gauge G. Suitable intermittent stock feeding mechanism is disclosed in the patent to Clouse, 2,139,936, December 13, 1938, and details thereof are not a part of this invention. The first blank $O_1$ is sheared from the stock, and as the shear rises it comes to rest in front of the first knockout pin $K_1$ which may be operated by a cam or other means well-known in the art, and which may be urged to its retracted position by a spring such as 19. Upon retraction of the slide, knockout $K_1$ pushes the blank between a pair of transfer fingers 21 and 22 which form part of a transfer mechanism T (Fig. 2) which may be like that disclosed in my aforesaid copending application and also has the many parts in common with the patent to Clouse, 2,026,823, dated January 7, 1936.

The timing and actuation of such knockout devices are familiar to those skilled in the art and form no part of the invention, but as is well-known in the art, the transfer operating mechanism is timed with the header slide so that when the slide is clear of the die a sheared blank is presented to the first die $D_1$. Thereafter the header advances and the punch $P_1$, carried by the first tool $T_1$ and resiliently urged in its extended position by a spring as at 24, forces the blank $O_1$ into the first die, and transforms it into the second blank $O_2$. Knockouts $K_3$ and $K_4$ for dies $D_2$ and $D_3$ are also operated in proper timed relationship to the transfer and header slide motions so that the blank is successively presented to the second die set $T_2$ and $D_2$, and to the final die set $T_3$ and $D_3$, where it is picked up by a special pair of transfer fingers 23 and presented to a blank-receiving and discharge tube 26. A ball 27 is urged by a spring 28 in a housing 29 against the last blank in the tube to retain it therein. The apparatus just described is claimed in my aforesaid copending application, it being noted that the final knockout $K_5$ is actuated when the header slide is advanced, instead of when it retracts as in conventional machines.

Referring to Fig. 4 wherein the first die set is shown in fragmentary section, it can be seen that the die recess 31, which is cylindrical, terminates in a tapered portion 32 which, with the end of the knockout pin $K_1$, forms the bottom wall of the die recess. The punch $P_1$ has a conical nose 34 that facilitates axial flow of the blank metal so that as the header slide advances, the end of a cylindrical blank is pressed against the bottom wall to form thereon a beveled end portion 33, completing blank $O_2$.

The blank $O_2$ is then presented to the second tool and die set $T_2$ and $D_2$. Die $D_2$ has a cylindrical bore 35 of substantially the same diameter as the cylindrical portion of blank $O_2$ and includes four lands 36 having beveled ends 37 so that a polygonal recess having a beveled entrance mouth or throat is provided. Preferably, when pipe plug blanks are being formed, the four corner portions 38 of the polygonal recesses are formed as prolongations of the cylindrical bore 35. As the blank $O_2$ is advanced into the die $D_2$ the beveled end of the blank 33 is brought against the beveled throat portions 37 of the lands 36. Further pressure causes the blank to be extruded into the polygonal recess, the beveled end of the blank cooperating with the beveled mouth of the polygonal recess to facilitate initiation of the extrusion action.

The action of the lands 36 is such that the portion of the blank being extruded tends to elongate, which in turn tends to cause the metal of the blank to relieve the pressure against the corners 38. However, separation between the blank at the corners 38 does not occur, because as soon as pressure is relieved metal flows in a direction having a lateral component toward the corners so that they remain substantially filled. This action, coupled with the drawing action of the beveled mouth enables the entire extruding operation to be effected in one die, yet pressures are not high and die wear is not severe.

Upon completion of the extrusion step the blank is ejected from the die by any suitable means such as knockout $K_2$, and presented to the third tool and die set $T_3$ and $D_3$. As best seen in Fig. 9, the blank $O_3$ which results from the step just described has a cylindrical body, flats 42, corners 41 that are an extension of the cylindrical body, and a beveled juncture 43 between each flat and the body. The die $D_3$ has a bottom wall formed by the knockout $K_3$ and has flat sides 52 and rounded corners 51 which form a polygonal recess of substantially the same size and shape in cross-section as the section of the shank of the blank $O_3$. The recess is intersected by a planar surface 53 which forms therewith relatively square corners 54, although these corners are rounded slightly to prevent excessive die wear. The tool $T_3$ has a conical recess 56 for gathering or upsetting the body of the blank into the required frustro-conical form.

As the blank is advanced into the die the beveled portions 43 thereof preferably engage the corners 54 along a midpoint of the beveled juncture such as the line $x-x$ in Fig. 9. Metal is displaced rearwardly and outwardly from adjacent the flats 42 toward the periphery of the cylindrical body thereby readily removing the beveled portions 43 without shearing up or breaking metal from the blank. Simultaneously, the tool and punch $P_3$ confine the blank body and upset or gather the metal thereof so that the body is axially shortened and tapered, producing the final blank $O_4$. The blank $O_4$ is pushed into the terminal transfer fingers 23 by knockout $K_5$ and presented to the discharge tube 26 which may lead to a collection station or to a threading or pointing machine which forms part of the header or which may be a separate device.

Thus, the final blank $O_4$ is formed with a square shank, an intermediate radial face 56, and a tapered body portion. No metal is sheared or torn from the blank. Since the shank is virtually completed in the second die, the final step may consist largely of a gathering or upsetting operation on the body, which is readily accomplished because the gathered portion has received virtually no cold work. Tool pressures at all stages are relatively low.

Having completed a detailed description of my method and apparatus that may carry out the method for making pipe plugs it will be understood by those skilled in the art that the blanks are made with a relatively few number of steps, none of which require excessive pressures and which may be readily performed with simple tool and die sets. It will be understood that although the apparatus illustrated for carrying out the method is a cold header, practise of the method is not limited to the use of a cold header and any apparatus which performs the steps described either separately or in multiple may be used without departing from the essence of the invention. Accordingly, the appended claims and not the detailed description of the invention determine the scope thereof.

What I claim is:

1. Apparatus for producing pipe plug blanks comprising a cold header having a bed frame, a die breast on said frame, a header slide reciprocable in said frame, a first die in said die breast having an axial cylindrical opening with a beveled bottom wall, a tool on said slide for beveling the end of a blank in said first die, a second die having an axial cylindrical opening, circumferentially spaced flat lands disposed in said opening and axially inwardly of the outer end thereof, the outer ends of said lands forming a beveled juncture with said opening, the zones between the sides of said lands being continuations of said opening, a tool on said slide for extruding a square shank on a blank confined in said opening, a third die having a polygonal opening intersecting the die face with relatively sharp corners, and a tool to force said blanks into said polygonal opening and head the projecting blank part.

2. Apparatus for producing pipe plug blanks comprising, a die having an axial cylindrical opening, circumferentially spaced flat lands disposed in said opening and axially inwardly of the outer end thereof, the outer ends of said lands forming a beveled juncture with said opening, the zones between the sides of said lands being continuations of said opening, a tool on said slide for extruding a square shank on a blank confined in said opening, another die having a polygonal opening intersecting the die face with relatively sharp corners, and a tool to force said blanks into said polygonal opening and head the projecting blank part.

3. Apparatus for producing pipe plug blanks comprising a die having an axial cylindrical opening, circumferentially spaced flat lands disposed in said opening and axially inwardly of the outer end thereof, the outer ends of said lands forming a beveled juncture with said opening, the zones between the sides of said lands being continuations of said opening, a tool on said slide for extruding a polygonal shank on a blank confined in said opening, another die having a polygonal opening intersecting the die face with relatively sharp corners, and a tool to force said blanks into said polygonal opening and head the projecting blank part.

References Cited in the file of this patent

UNITED STATES PATENTS

| Number | Name | Date |
|--------|------|------|
| 329,286 | Dalzell | Oct. 27, 1885 |
| 1,419,588 | Ryerson | June 13, 1922 |
| 1,430,004 | Carlson | Sept. 26, 1922 |
| 1,619,495 | Wilcox | Mar. 1, 1927 |
| 1,642,696 | Rateike | Sept. 20, 1927 |
| 1,933,737 | Kaufman | Nov. 7, 1933 |
| 2,012,022 | Richardson | Aug. 20, 1935 |
| 2,038,543 | Clouse | Apr. 28, 1936 |
| 2,074,678 | Wilcox | Mar. 23, 1937 |
| 2,113,172 | Cordes | Apr. 5, 1938 |
| 2,140,775 | Crosbie | Dec. 20, 1938 |